(12) United States Patent
Mittal

(10) Patent No.: US 11,563,959 B2
(45) Date of Patent: *Jan. 24, 2023

(54) ADAPTIVE VIDEO QUALITY

(71) Applicant: V-NOVA INTERNATIONAL LIMITED, London (GB)

(72) Inventor: Gaurav Mittal, London (GB)

(73) Assignee: V-NOVA INTERNATIONAL LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 17/164,422

(22) Filed: Feb. 1, 2021

(65) Prior Publication Data

US 2021/0329274 A1  Oct. 21, 2021

Related U.S. Application Data

(63) Continuation of application No. 16/078,352, filed as application No. PCT/GB2017/050584 on Mar. 3, 2017, now Pat. No. 10,911,762.

(30) Foreign Application Priority Data

Mar. 3, 2016 (GB) ..................... 1603727

(51) Int. Cl.
*H04N 19/30* (2014.01)
*H04N 19/124* (2014.01)
(Continued)

(52) U.S. Cl.
CPC .......... *H04N 19/30* (2014.11); *H04N 19/124* (2014.11); *H04N 19/136* (2014.11);
(Continued)

(58) Field of Classification Search
None
See application file for complete search history.

(56) References Cited

U.S. PATENT DOCUMENTS 6,788,740 B1 * 9/2004 van der Schaar ...... H04N 19/34
375/240
8,873,621 B2 * 10/2014 Kim ............... H04N 21/234327
375/240.03

(Continued)

FOREIGN PATENT DOCUMENTS

EP      2068567     6/2009
WO    2013-011495   1/2013

OTHER PUBLICATIONS

MacNicol et al., "Scalable Video Coding by Stream Morphing", IEEE Transactions on Circuits and Systems for Video Technology, IEEE Service Center, Piscataway, NJ, vol. 1, 15, No. 2, Feb. 1, 2005, pp. 306-319.

(Continued)

*Primary Examiner* — Mohammad J Rahman
(74) *Attorney, Agent, or Firm* — Workman Nydegger

(57) ABSTRACT

A method for encoding a first stream of video data comprising a plurality of frames of video, the method, for one or more of the plurality of frames of video, comprising the steps of: encoding in a hierarchical arrangement a frame of the video data, the hierarchical arrangement comprising a base layer of video data and a first enhancement layer of video data, said first enhancement layer of video data comprising a plurality of sub-layers of enhancement data, such that when encoded: the base layer of video data comprises data which when decoded renders the frame at a first, base, level of quality; and each sub-layer of enhancement data comprises data which, when decoded with the base layer, render the frame at a higher level of quality than the base level of quality; and wherein the steps of encoding the sub-layers of enhancement data comprises: quantizing the enhancement data at a determined initial level of quantization thereby creating a set of quantized enhancement data; associating to each of the plurality of sub-layers a (Continued)

respective notional quantization level and allocating, for each of the plurality of sub-layers, a sub-set of the set of quantized enhancement data based on the respective notional quantization level.

20 Claims, 9 Drawing Sheets

(51) Int. Cl.
    *H04N 19/136*     (2014.01)
    *H04N 19/172*     (2014.01)
    *H04N 19/182*     (2014.01)
    *H04N 19/187*     (2014.01)

(52) U.S. Cl.
    CPC ......... *H04N 19/172* (2014.11); *H04N 19/182* (2014.11); *H04N 19/187* (2014.11)

(56) References Cited

U.S. PATENT DOCUMENTS

| | | |
|---|---|---|
| 2002/0116473 A1 | 8/2002 | Gemmell |
| 2005/0030205 A1 | 2/2005 | Konoshima et al. |
| 2007/0223579 A1* | 9/2007 | Bao ..................... H04N 19/463 375/240.12 |
| 2008/0219354 A1* | 9/2008 | Segall ................... H04N 19/40 375/240.23 |
| 2009/0074060 A1* | 3/2009 | Kim ..................... H04N 19/187 375/240.12 |
| 2010/0153574 A1 | 6/2010 | Lee |
| 2011/0261876 A1 | 10/2011 | Tan et al. |
| 2012/0224630 A1 | 9/2012 | Peng |
| 2013/0013803 A1 | 1/2013 | Bichot |
| 2013/0070859 A1 | 3/2013 | Lu et al. |
| 2014/0015925 A1* | 1/2014 | Li ......................... H04N 19/105 348/43 |
| 2014/0044178 A1* | 2/2014 | Li .......................... H04N 19/30 375/240.12 |
| 2014/0304377 A1 | 10/2014 | Andersson |
| 2015/0312580 A1* | 10/2015 | Hannuksela ........... H04N 19/31 375/240.02 |
| 2017/0094288 A1* | 3/2017 | Hannuksela ......... H04N 19/146 |
| 2017/0164008 A1 | 6/2017 | Qu et al. |

OTHER PUBLICATIONS

Chee Y-K, "Survey of Progressive Image Transmission Methods", International Journal of Imaging Systems and Technology, Wiley and Sons, New York, US, vol. 10, No. 1, Jan. 1, 1999.
International Search Report and Written Opinion for PCT/GB2017/050584 dated May 29, 2017.
Search Report for GB 1603727.7 dated Aug. 24, 2016.
M. van der Schaar et al., "Unequal packet loss resilience for fine-granular-scalability video", in IEEE transactions on multimedia, vol. 3, No. 4, pp. 381-394, Dec. 2001, doi: 10.1109/6046.966110.

* cited by examiner

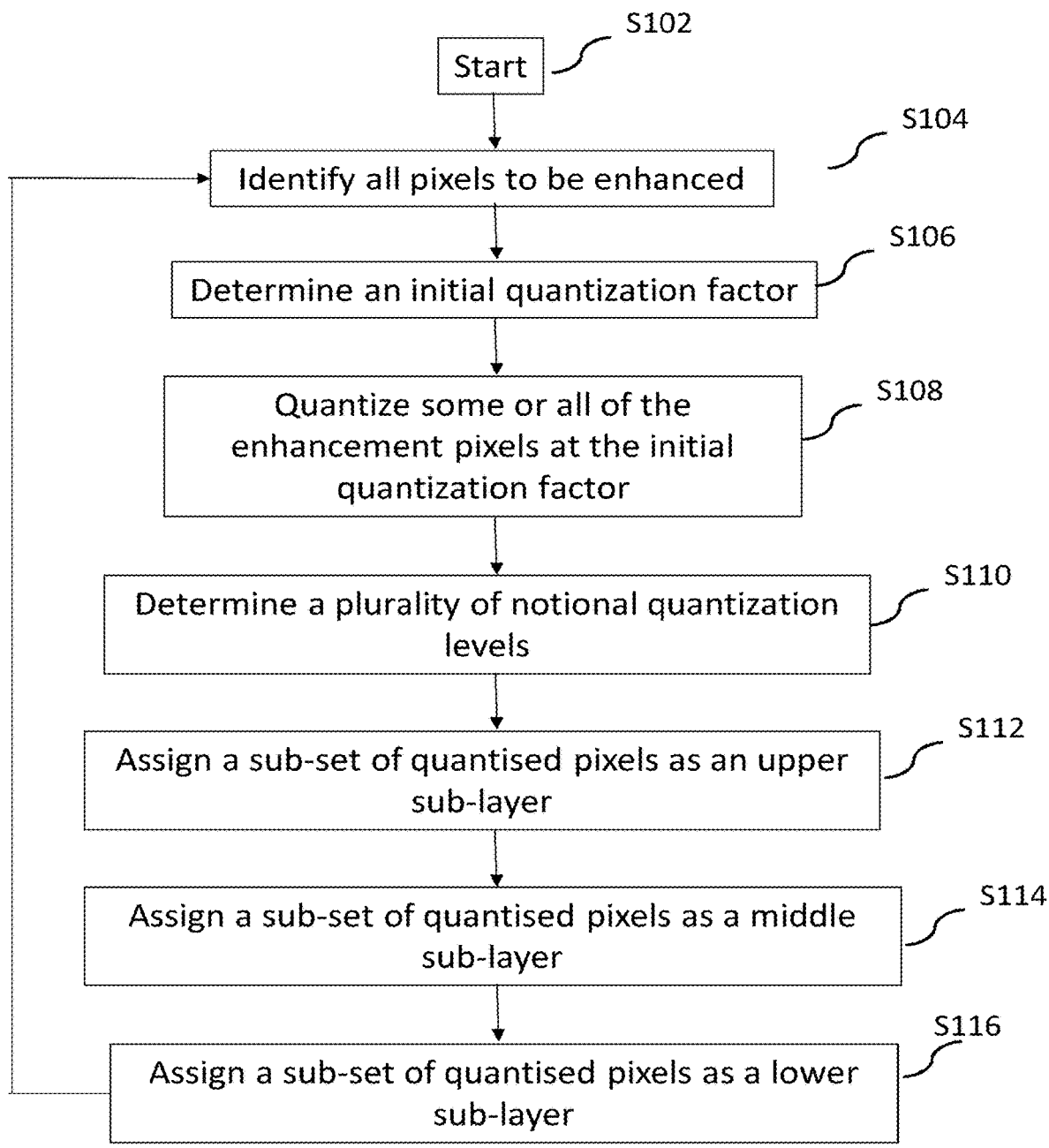

ADAPTIVE VIDEO QUALITY

CROSS-REFERENCE TO RELATED APPLICATIONS

The present application is a continuation of U.S. patent application Ser. No. 16/078,352, filed Aug. 21, 2018, which is a 371 US National Stage Entry of PCT/GB2017/050584, filed Mar. 3, 2017, which claims priority to UK Patent Application No. 1603727.7, filed Mar. 3, 2016, the entire disclosures of which are incorporated herein by reference.

FIELD OF INVENTION

The invention relates to a system and method for adaptively varying the quality of a stream of video data in order to ensure that the stream may be decoded at the highest possible quality which the decoding device can handle. In particular the invention relates to a methodology of encoding a stream of video data which enables adaptive video quality decoded.

BACKGROUND TO THE INVENTION

Video content providers use set-top boxes to deliver content to end users, and those set-top boxes may vary in age and quality. As a result, the video decoding capability of the set-top boxes currently used to receive video content from a content provider varies between poor and excellent.

Furthermore, it is known that within a level of resolution (e.g., Standard Definition or SD, 720 p High Definition of HD, 1080 p HD, Ultra HD) a number of profiles which define a set of capabilities may be defined. For example in H264, a profile defines the requirements to decode a particular stream and is typically associated with a class of application. Accordingly, a content provider may have to broadcast to a number of set-top boxes which have varying profiles with some boxes unable to decode the content, or unable to use their full capabilities.

Similarly an end user may decode a stream on a device such as a smartphone, tablet computer, laptop etc., and the video decoding capabilities of such devices may vary greatly.

In order to ensure that that all users are able to view content, the content delivery network (CDN) has to provide the content either: at the lowest supported specification, or profile, (thereby meaning that many of the devices such as set-top boxes are unable to view the content at their best/optimal capabilities as the content is provided at a lower specification); or provide multiple channels showing the same content at different qualities, or profiles (resulting in increasing costs and bandwidth for the CDN).

SUMMARY OF THE INVENTION

In order to mitigate for at least some of the above problems, there is provided a method for encoding a first stream of video data comprising a plurality of frames of video, the method, for one or more of the plurality of frames of video, comprising the steps of: encoding in a hierarchical arrangement a frame of the video data, the hierarchical arrangement comprising a base layer of video data and a first enhancement layer of video data, said first enhancement layer of video data comprising a plurality of sub-layers of enhancement data, such that when encoded: the base layer of video data comprises data which when decoded renders the frame at a first, base, level of quality; and each sub-layer of enhancement data comprises data which, when decoded with the base layer, render the frame at a higher level of quality than the base level of quality; and wherein the steps of encoding the sub-layers of enhancement data comprises: quantizing the enhancement data at a determined initial level of quantization thereby creating a set of quantized enhancement data; associating to each of the plurality of sub-layers a respective notional quantization level and allocating, for each of the plurality of sub-layers, a sub-set of the set of quantized enhancement data based on the respective notional quantization level.

The arrangement of the stream provides multiple benefits. As identified above in the prior art the stream is encoded at the lowest supported specification as determined by the recipient decoder, as such a number of recipient decoders are not used to their optimal ability as the stream is deliberately downgraded to ensure that all devices are able to decode the stream. As the base layer of the stream enables a minimum level of quality to be rendered by a decoding device, all decoders are able to render the video, as a minimum, at a base level of quality. The arrangement of the stream further enables the decoder to decode, in a hierarchical fashion, further enhancement information, which when decoded with the base layer produces a video with an enhanced level of quality. As multiple sub-layers of enhancement data are provided within the encoded stream a given recipient decoder decodes as many sub-layers of enhancement data as it is able to (limited by bandwidth and device capabilities) in order to ensure that video is rendered at the optimal of the ability of the decoder. As such each individual decoder may be used to its full capabilities, without having to provide multiple streams for the various profiles of user.

By associating each sub-layer with a notional quantization level each sub-layer comprises the data which renders the video at an enhanced level of quality equivalent to the notional quantization amount. Advantageously as the enhancement layers contain data regarding the individual pixels to be enhanced if the bandwidth is insufficient to download the entirety of a sub-layer for a given frame, or set of frames, (i.e. a sub-layer is only partially downloaded) the decoder may progress to the next chunk of data without having to download the remainder of the sub-layer. In many prior art systems as the data is encoded with reference to other frames, once downloading of a layer of data (such as an enhancement layer) has begun the layer must be downloaded in its entirety before progressing to the next chunk of data. Such an arrangement can result in delays due to buffering etc., when the available bandwidth changes.

Further aspects of the invention will be apparent from the description and the claims.

BRIEF DESCRIPTION OF THE FIGURES

FIG. 4 is a flow chart of the methodology of encoding an adaptive video quality stream according to an aspect of the invention;

DETAILED DESCRIPTION OF AN EMBODIMENT

The present invention defines a system and method for encoding a video stream in such a manner that enables the recipient decoder to adaptively vary the quality of the stream according to available bandwidth and the capabilities of the decoder.

By encoding the stream in a hierarchical arrangement it is possible to define a base level, which all recipient devices are able to decode, and one or more enhancement layers which when decoded enable the stream to be rendered at a higher level of quality than the base layer. Each enhancement layer has a plurality of sub-layers which contain a subset of pixels which when decoded render the frame at a notional level of quantization. Therefore depending on the capabilities of the decoder and the available bandwidth the image may be decoded at a number of different levels of quality and levels of quantization. Such an arrangement also ensures that the same stream may be decoded by multiple devices at different levels of quality and quantization thus ensuring the stream can be provided to the optimal ability of the decoder.

Figure 1:
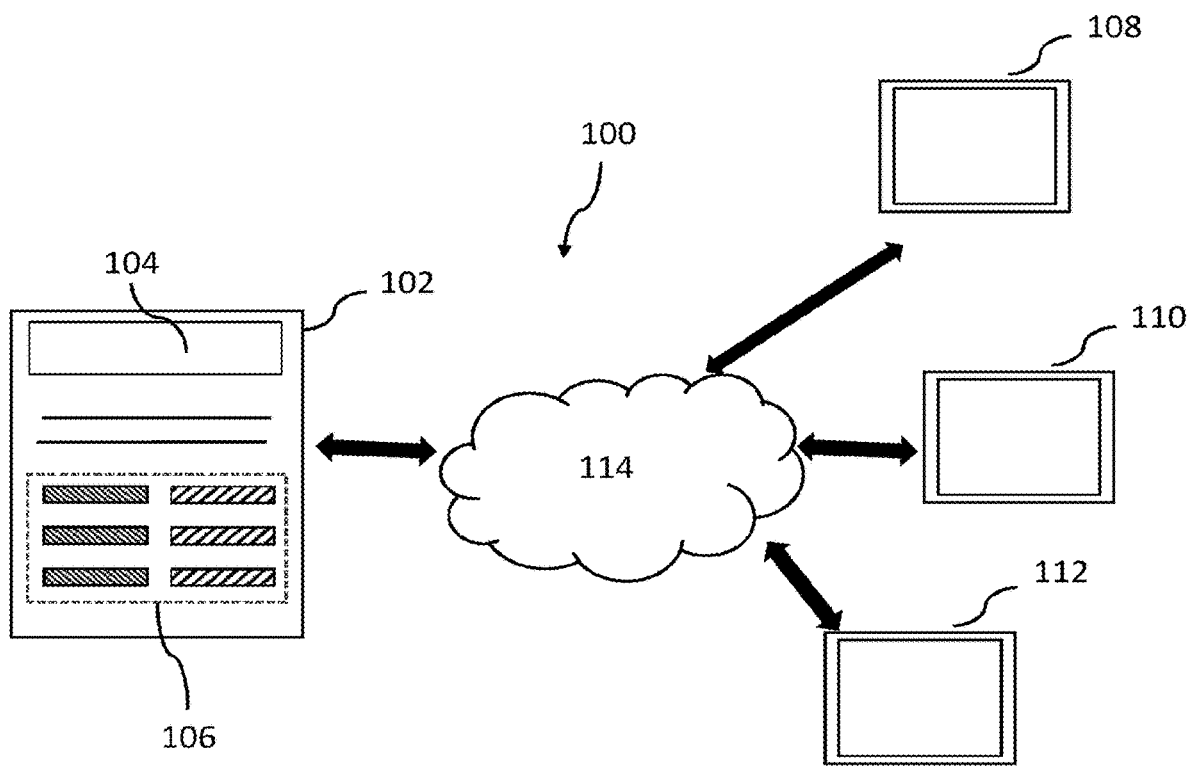
FIG. 1 is a block diagram of an exemplary system for performing an adaptive video quality methodology according to an aspect of the invention.

FIG. 1 is a block diagram of a system for performing an adaptive video quality methodology according to an aspect of the invention.

In FIG. 1 there is shown the system 100, the system 100 comprising a streaming server 102 connected via a network to a plurality of client devices 108, 110, 112.

The streaming server 104 comprising an encoder 104, the encoder configured to encode a first video stream utilising the methodology described herein. The streaming server 104 is configured to deliver an encoded video stream 106 to a plurality of client devices such as set-top boxes, 108, 110 and 112. Each client device 108, 110 and 112 is configured to decode and render the encoded video stream 106. The client devices and streaming server 104 are connected via a network 114.

For ease of understanding the system 100 of FIG. 1 is shown with reference to a single streaming server 102 and three recipient set-top boxes 108, 110, 112 though in further embodiments the system 100 may comprise multiple servers (not shown) and several tens of thousands of set-top boxes. In further embodiments the client devices 108, 110, 112 may be any other devices capable of decoding video streams such as smart TVs, smartphones, tablet computers, laptop computers etc.

The streaming server 102 can be any suitable data storage and delivery server which is able to deliver encoded data to the set-top boxes over the network. Streaming servers are known in the art, and may use unicast and/or multicast protocols. The streaming server is arranged to store the encoded data stream, and provide the encoded video data in one or more encoded data streams 106 to the client devices 108, 110 and 112. The encoded video stream 106 is generated by the encoder 104. The encoder 104 in FIG. 1 is located on the streaming server 102, though in further embodiments the encoder 104 is located elsewhere in the system 100. The encoder 104 generates the encoded video stream in accordance with the methodology as described with reference to FIGS. 3 and 4.

The client devices 108, 110 and 112 are devices such as set-top boxes, which are well known in the art. As is known in the art the capabilities of the set-top boxes in such a system 100 vary. For example in FIG. 1 set-top box 108 is an older set-top box and only able to decode SD resolution, set-top box 110 is a more advance box than set-top box 108 and able to decode at a higher resolution such as 720 p and set-top box 112 is able to decode at 1080 p. Such variation in set-top box capabilities is typically seen where, for example, a broadcaster will provide new set-top boxes to new clients and slowly introduce the updated boxes to existing clients meaning that a number legacy devices are constantly in use.

An input video stream is encoded at the encoder 104 to generate an encoded data stream 106. As described in detail below the encoded data stream 106 is encoded in such a manner to comprise data that enables the plurality of client devices to decode the video stream in accordance with the maximum capability of the set-top box. Accordingly, the single encoded data stream 106 is able to provide an encoded stream which may be decoded at different video qualities in accordance with the capabilities of the client device 108, 110, 112. Furthermore, the encoded data stream 106 is encoded is such a manner that depending on the capabilities of the device and the network the data stream 106 that the level of quality of the video decoded video may vary over time for each device. Accordingly, the system 100 is configured to provide a data stream which enables an adaptive variation in the quality of the video rendered.

Figure 2:
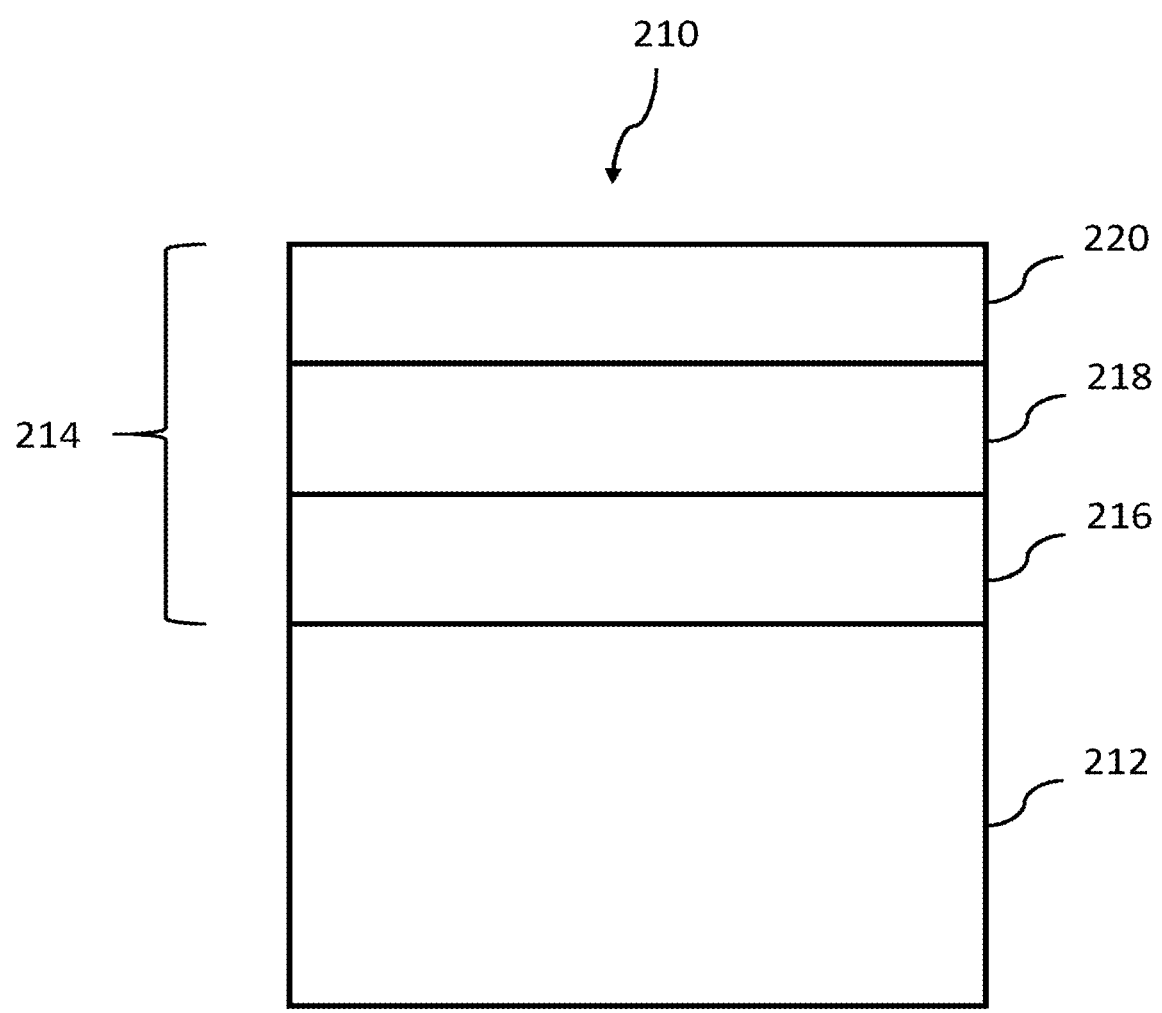
FIG. 2 is a schematic representation of the data structure according to an aspect of the invention.

FIG. 2 is a schematic representation of the hierarchical arrangement of an encoded video stream according to an aspect of the invention.

There is shown the encoded stream 210, the encoded stream 210 comprising a base layer 212, and enhancement layer 214. The enhancement layer comprises a plurality of sub-layers of enhancement data, comprising a first sub-layer 216, a second sub-layer 218 and a third sub-layer 220. For ease of understanding only three sub-layers of enhancement data 216, 218, 220 are shown, though it is to be understood that further sub-layers of enhancement data may be present.

Each individual frame, or segment, comprising a plurality of frames, is encoded in a manner such as shown in FIG. 2. In a preferred embodiment the hierarchical encoding of the frame or segment means that each frame is encoded with reference to itself and does not contain any information regarding other frames.

The base layer 212 comprises data encoded in a known video encoding standard, for example MPEG-4 at standard definition. Preferably, the base layer 212 is chosen as the highest standard of video which can be decoded by all devices. In other words all recipient devices are able to decode and render the base layer. In further embodiments, where the video is encoded as described above with reference to PCT/IB2012/053723 where the video is encoded in a hierarchical arrangement. In such an arrangement there is a layer with a lowest (base) level of quality and one or more enhancement layers which define higher levels of quality. In such embodiments the base layer 212 may be defined as the lowest level of quality, and in further embodiments is the base layer 212 comprises a base layer and one or more enhancement layers. That is to say the base layer 212 already comprises some form of enhancement data and the invention provides further enhancement data.

The sub-layers of enhancement data 216, 218, 220 provide further data which when decoded with the base layer 212 will enable a device to decode and render the video data at a higher level of quality than the base layer.

The first sub-layer of enhancement data 216 which when decoded with the base layer 212 would render the stream at a higher level of quality. The higher level of quality may be defined by the resolution of the video (e.g. the first level of quality layer being equivalent to a form of HD stream) or other metrics (such as profile, colour, signal-to-noise etc.). In an embodiment the base layer 212 and enhancement layer 214 are encoded at the same resolution and, as described below in detail with reference to FIGS. 4 and 5, each sub-layer of enhancement data provides information to enhance, or correct, individual pixels thereby improving the quality of the image. Accordingly the first sub-layer of enhancement data 216 when decoded with the base layer 212 renders the video at the same level of resolution as the base layer, wherein a plurality of pixels of the base layer are enhanced/corrected to provide an image with a higher level of quality than the base image. In an embodiment the base layer 212 and first enhancement layer 216 when decoded together would return a decoded frame which is equivalent to a first, nominal, profile. The second sub-layer of enhancement data 218 which when decoded with the base layer 212 and the first sub layer 216 provides further data regarding individual pixel correction, thereby rendering the image at level of quality that is higher than the level of quality associated with the first sub-layer 216. In an embodiment the base layer 212 and first and second enhancement layers when decoded together would result in a decoded frame which is equivalent to a second nominal profile, wherein the second profile is associated with a higher set of capabilities than the first nominal profile. Similarly the third sub-layer of enhancement data 220 comprises data regarding a further set of correction/enhancement data for individual pixels which when decoded with the base layer 212 and the first 216 and second 218 sub-layers of enhancement data renders the frame at an even higher level of quality. Again, the base layer 212 and first, second and third enhancement layers would result in a decoded frame which is equivalent to a third nominal profile, wherein the third profile is associated with a higher set of capabilities than the first and second nominal profiles.

In further embodiments the first sub-layer of enhancement data 216 when decoded with the base layer 212 renders the video at 720 p. The second sub-layer of enhancement data 218 which when decoded with the base layer 212 and the first sub layer renders the video at 1080 p and the third sub-layer of enhancement data 220 when decoded with the base layer 212 and the first 216 and second 218 sub-layers of enhancement data renders the stream at UHD. Therefore each sub-layer of enhancement data is associated with a level of quality, which may be defined by the resolution or other metrics.

The hierarchical arrangement allows for multiple profiles to be present in the single stream. The base layer being a baseline profile defining the minimum level of quality accessible by all decoders. Each sub-layer of enhancement data can define a further profile associated with the video.

As the data is arranged in a hierarchical manner, for each frame, or segment of data, the base layer 212 is downloaded first followed by the data of the first sub-layer of enhancement data 216, the second sub-layer of enhancement data 218 and the third sub-layer of enhancement data 220.

Figure 3:
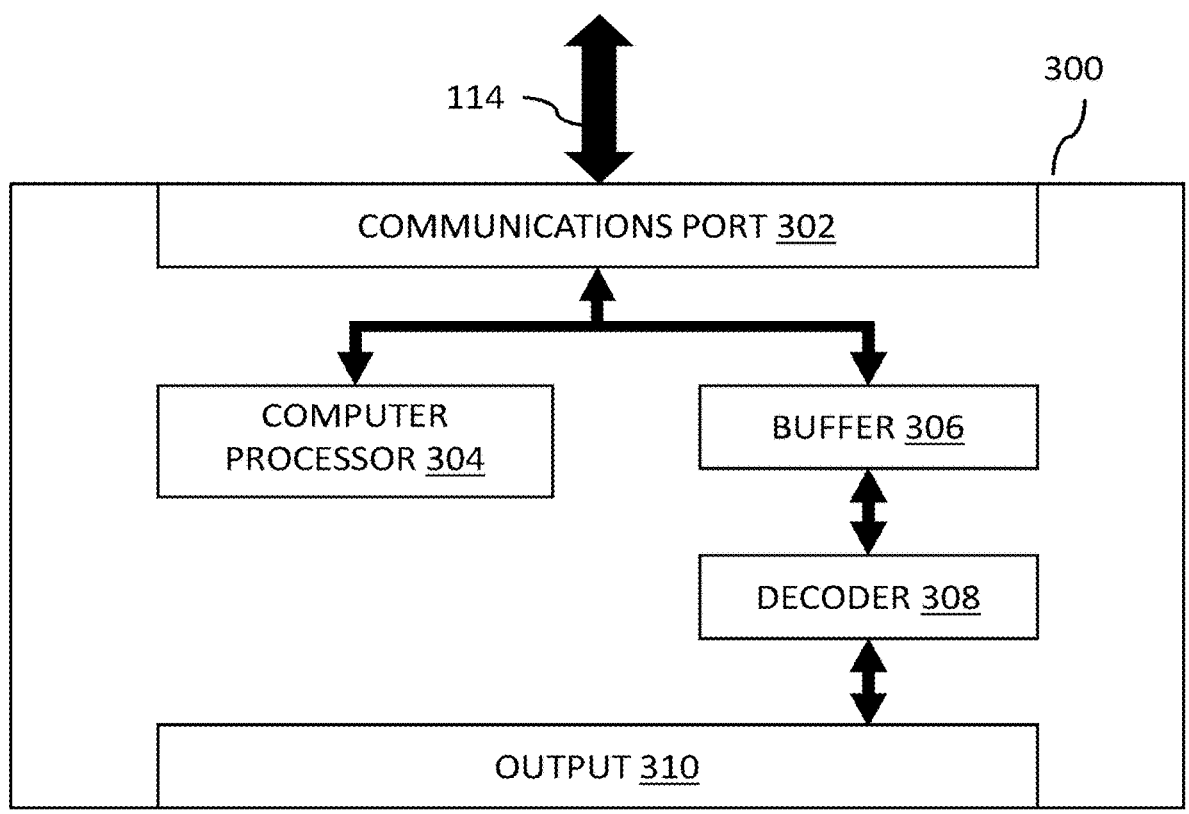
FIG. 3 is a block diagram of an exemplary set-top box which is configured to decode a video stream encoded using the data structure of FIG. 2.

FIG. 3 is a block diagram showing an example client device 300 (equivalent to devices 108, 110, 112 in FIG. 1) which is configured to decode a stream encoded in accordance with an aspect of the invention. In a preferred embodiment the client device is an OTT enabled device, for example a smartphone, tablet computer, desktop computer or set-top box and the OTT box 300 comprises a communications port 302 coupled to network 114, a processor 304, a buffer 306, a decoder 308 and an output 310.

The computer processor 304 is configured to initiate and control reception of the encoded data stream via the communications port 302, which is in turn configured to communicate with the streaming server 102 across the data network 114. As is known in the art, the buffer 306 is configured, under the control of the computer processor 304, to buffer, or cache, the data, before sending the buffered part of the encoded data stream to the decoder 308 for decoding after a prescribed time period. The decoder 308 is configured to decode the buffered part of the encoded data stream and to pass the decoded data to the output 310 for presentation to a user.

Clearly, the above description is a simplified version of how encoded data streams are buffered, decoded and, if appropriate, output, and is provided not as a comprehensive discussion as to how the decoding and display of encoded data in client devices works, but so as to give sufficient context in which to explain the invention.

As described above the decoder 308 of every OTT device, such as the set-top box is configured to be able to decode the base layer 212. Depending on the capabilities of the set-top box processor 304 and decoder 308 a device may or may not be able to decode the enhancement information as provided in one or more of the sub-layers of enhancement data. Furthermore as the data is arranged in a hierarchical manner, if the bandwidth available in the network means that the set-top box is unable to buffer the entirety of the enhancement data, the set-top box as a minimum would be able to render the base layer thus ensuring a minimum level of quality at all times.

If the processor 304 and decoder 308 are able to decode the one of more sub-layers of enhancement information an image with a level of quality higher than the base layer is provided to the output 310. Therefore depending on the capabilities of the set-top box the quality of the video provided to the output 310 may be varied, and beneficially ensures that when the data is provided to multiple set-top boxes, each set-top box is able to decode the stream at its maximum capability.

FIG. 4 is a flow chart of the process of encoding the video stream according to an aspect of the invention, and FIGS. 5A to 5E are a diagrammatic representation of the output of various steps relating to the selection and encoding of pixels in a frame in accordance with the method of FIG. 4.

The process starts at step S102 where a video stream to be encoded is received at the encoder of the system 100.

For one or more of the frames of the video stream, the encoder encodes the frame in accordance with the methodology as defined by steps S104 to S116, so as to encode the frame in the hierarchical manner.

At step S104 the encoder identifies which pixels of the frame are to be enhanced. When a frame is encoded, differences between the encoded frame and a reference frame (which may be the raw frame, or a frame encoded in a different manner) will be apparent. Such differences, or residuals, are artefacts of the encoding process. The extent of the residuals is dependent on the encoding processing, and the parameters used such as the level of quantization.

The residual therefore is indicative of the amount of enhancement required for a given pixel in the encoded frame to be visually indistinct from the reference frame. Therefore in an embodiment by comparing the encoded frame with a reference frame the residuals are calculated and all pixels which are to be enhanced are identified in order to render the frame at the higher level of quality.

Therefore at step S104 each of the individual pixels which are to be enhanced with enhancement data are identified.

In a preferred embodiment the encoded frame is the frame encoded at the base layer 212, and the reference frame is a frame quantized at the theoretical maximum level of quantization for a given bandwidth. As such the pixels which display the largest difference between the pixels in the comparison frame and base layer can be identified are deemed to be the pixels which need to be "touched" or enhanced.

In further embodiments other suitable metrics are used to determine which pixels are to be enhanced.

Figure 5A:
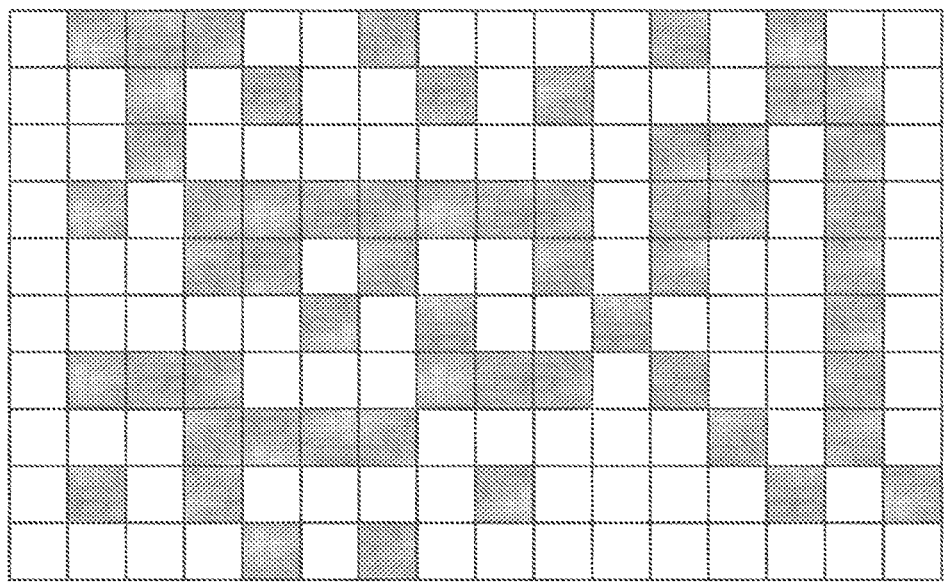
FIGS. 5A to 5F are schematic representations of the selection and encoding of pixels according to the method of FIG. 4.

FIG. 5A is an example of a frame in which the pixels to be enhanced have been identified as per step S104. FIG. 5A is a graphical representation of a frame of pixels, comprising an array of pixels in the x and y direction. The number of pixels in each direction is denoted N, and each pixel may be described by its co-ordinates x.sub.n y.sub.n where n is nth pixel in the x or y direction.

As is known in the art each pixel will also be associated with data to describe the pixel. In FIG. 5A the black pixels represent the pixels which are identified at step S104 as those showing a residual and therefore in need of enhancement, that is to say they are to be enhanced in order to provide a frame at a higher level of quality. Each pixel may then be identified by their coordinates.

Not all the pixels which are identified at step S104 (and shown in FIG. 5A) have the same importance, in that some pixels will add a more significant correction than other pixels. For example, the pixels which provide the most significant correction would be deemed to be the most important, as these pixels would provide the greatest effect on the level of quality of the frame.

At step S106 an initial quantization factor is determined. The initial quantization factor is representative of the amount of data that can be encoded, and which is based on the available bandwidth, via a rate control mechanism. All the pixels which could be enhanced with enhancement data are identified at step S104, however due to bandwidth considerations it is typically not possible to encode all enhancement data. Accordingly, a subset of the enhancement pixels are encoded. As described in detail below the subset of pixels which are encoded are beneficially selected as those which are visually the most important.

Once the initial quantization factor is determined, the enhancement pixels (i.e. the pixels determined at step S104 to require enhancement data) are quantized at the determined initial quantization level at step S108. Therefore, in most situations only a subset of the enhancement pixels are therefore encoded at the initial quantization level at step S108. As the most important enhancement pixels are those with the most information (as they contain the most correction information) during the quantization stage such pixels are beneficially quantized in preference. The quantization of the enhancement data occurs in a known manner.

In further embodiments the initial quantization factor is fixed, for example q=0.6.

Figure 5B:
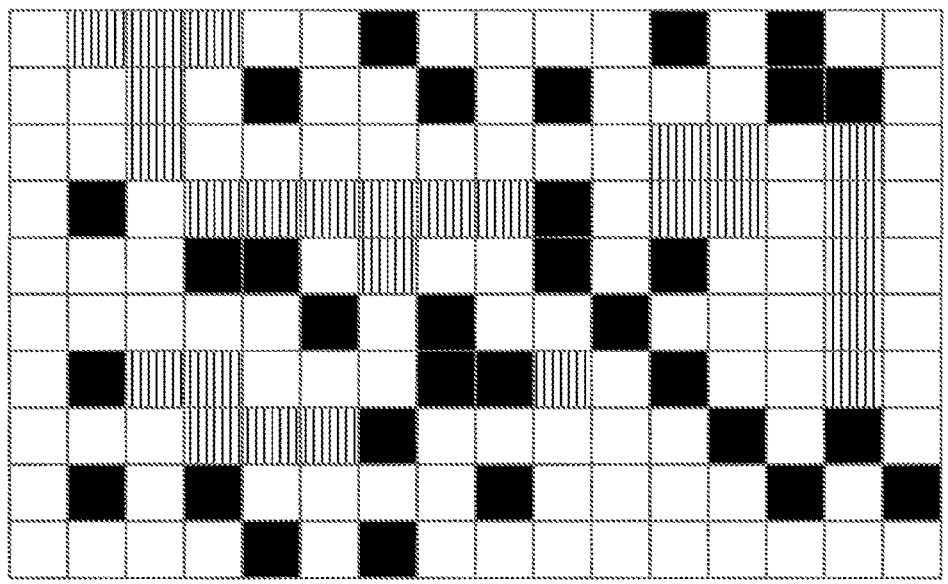

FIG. 5B graphically represents the output of step S108.

FIG. 5B shows the same frame as FIG. 5A and as is shown in FIG. 5B, as the black and cross hatched pixels are the same pixels as identified in FIG. 5A to be enhanced. In FIG. 5B the black pixels are the pixels to be enhanced that are quantized at the initial quantization level as at step S108. The pixels with the vertical hatching are the pixels to be enhanced which due to the initial level of quantization used (e.g. q=0.6) have not been encoded. That is to say the enhancement data associated with the pixels with the vertical hatching is not encoded, and accordingly the enhancement data for these pixels is not present in the enhancement layer 214. Beneficially the pixels which are quantized (the black pixels) are those which are identified as being the pixels with the most important enhancement data.

Accordingly, at step S108 a subset of the enhancement pixels are quantized, where the amount of enhancement pixels which are quantized varies according to the initially determined quantization factor. Depending on the conditions the initial quantization factor may change resulting in fewer or greater number of pixels being quantized. Beneficially, due to the selection mechanism utilized the most important enhancement pixels are quantized.

Once the enhancement data has been quantized at step S108, the enhancement data of the pixels to be enhanced is divided into sub-layers, each sub-layer representative of a notional quantization level of the enhancement data. As described above, the initial quantization level is representative of the highest level of quantization possible for a given data set and conditions. As such the initial level of quantization is representative of the highest level of quality achievable.

At step S110 a plurality of notional quantization levels are determined. In an embodiment three notional quantization levels are determined, with the upper notional quantization level being equivalent to the initial quantization level as determined at step S106. The second, middle, quantization level is lower than the first, level (thereby effectively reducing the number of pixels to be enhanced which are quantized) and the third lower quantization level being less than the second quantization levels (thereby effectively further reducing the number of pixels to enhanced which are quantized).

In an embodiment the third lower level of quantization is determined as being the minimum acceptable quality for the stream and as a default is set at q=0.2. The middle level of quantization is then set as the mid-point between the upper and lower levels of quantization. In further embodiments other values, and other methods of setting the values, may be used. In further embodiments the levels of quantization are fixed, for example q=0.6, 0.4, and 0.2.

At step S112 an upper sub-layer is defined as the enhancement pixels which would be quantized when the notional level of quantization is equivalent to the initial level of quantization as determined at step S108.

As the enhancement data has already been quantized (at step S108) the initial level of quantization is a notional level of quantization as the data is not quantized utilising the initial level of quantization rather the methodology determines which pixels of the already quantized data would have been quantized. Accordingly steps S112, S114 and S116 refer to a notional quantization as it determines notionally which pixels would have been quantized at the given level of quantization.

Figure 5C:
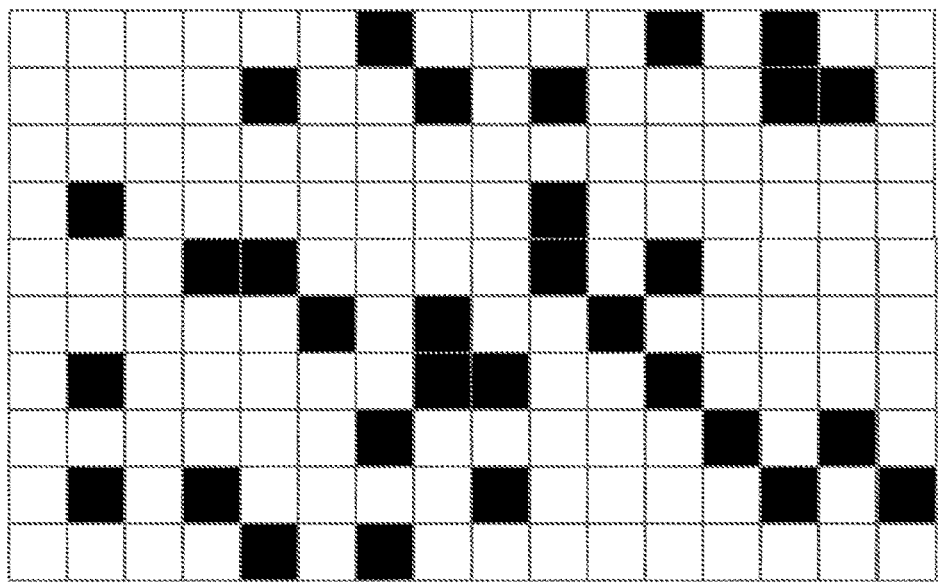

FIG. 5C illustrates the pixels which are defined as the upper sub-layer of quantized enhancement data as the black pixels. As can be seen in FIG. 5C the pixels that are quantized are the black pixels in FIG. 5B (i.e. the pixels of enhancement data which were quantized).

At step S114 the middle sub-layer of enhancement data is defined. The middle sub-layer of enhancement data is defined by utilising the middle level of quantization (which is lower than the initial quantization value) and determining which pixels of the enhancement data would have been quantized had the middle level of quantization value been used to quantize the enhancement data. As stated above no further quantization has occurred thereby reducing computational cost.

Figure 5D:
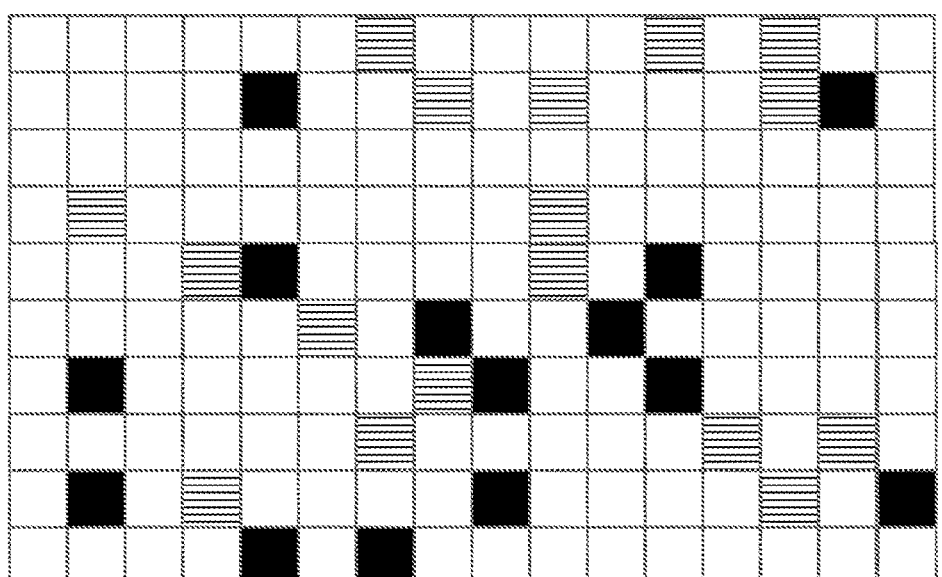

FIG. 5D is a graphical representation of the output of step S114.

In FIG. 5D there is shown the pixels of the frame where the quantized pixels of enhancement data are represented by the black and cross hatched pixels. The pixels with the horizontal hatching represent the pixels which would have been quantized have the middle, notional, level of quantization been used. The black pixels are the remaining quantized pixels. Accordingly, as can be seen in FIG. 5D the middle sub-layer of enhancement data is a subset of the upper sub-layer of enhancement data.

At step S116 the lower sub-layer of enhancement data is defined. The lower sub-layer of enhancement data is defined by utilising the determined lower level of quantization (which is lower than the upper and middle quantization values). As with the upper and middle quantization values, the lower sub-layer of enhancement data is determined by identifying which pixels of the enhancement data would have been quantized had the lower level of quantization value been used to quantize the enhancement data.

As the enhancement data has already been quantized step S116 results in a notional level of quantization, as it simply calculates which pixels would have been quantized had the lower quantization value been used at step S108.

Figure 5E:
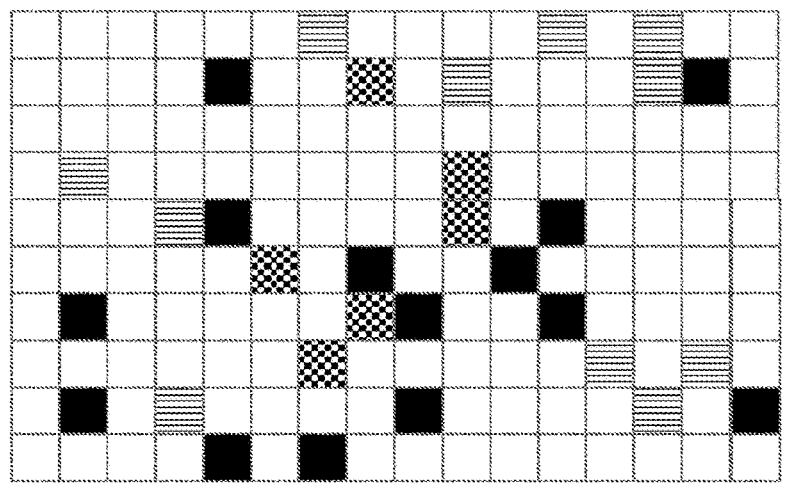

FIG. 5E is a graphical representation of the output of step S116.

In FIG. 5E there is shown the pixels of the frame where the quantized pixels of enhancement data are represented by the black pixels, pixels with horizontal hatching and pixels with a checkerboard pattern. In FIG. 5E the pixels with the checkerboard pattern represent the pixels identified as forming the lower sub-layer of enhancement data. As can be seen the pixels of the lower sub-layer are a subset of the pixels of middle sub-layer. As in FIG. 5D the pixels with the horizontal hatching represent the pixels which would have been quantized have the middle, notional, level of quantization been used and the black pixels are the remaining quantized pixels.

In the example given above three notional quantization levels are used to define three sub-layers of enhancement data, and in further embodiments a different number of notional quantization levels may be used to define a different number of sub-layers. As defined with reference to FIG. 2 each sub-layer may be associated with a profile (representative of the capabilities of a decoding device), and depending on the number of profiles to be catered for the number of sub-layers may increase, or decrease, as appropriate. As the methodology utilises a notional level of quantization, the quantization step only occurs once regardless of how many sub-layers are defined. Accordingly, the computational cost for quantizing the frame does not increase as the number of sub-layers increases as the step of quantization occurs once.

Figure 5F:
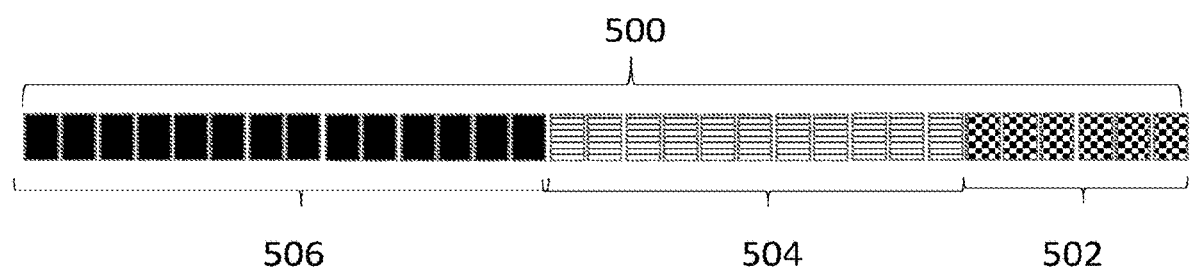

FIG. 5F illustrates the final distribution of the encoded enhancement pixels in accordance with the above described process.

In FIG. 5F the full set of quantized pixels 500 as identified at step S108 are shown. The full set of quantized pixels 500 comprises: a sub-set of quantized elements allocated to the lower sub-layer 502; a sub-set of quantized elements allocated to the middle sub-layer 504; and a sub-set of quantized elements allocated to the upper sub-layer 506.

As the data is arranged in a hierarchical manner as described with reference to FIG. 2, set-top box 108 (which has the lowest capabilities) would receive the stream and decode the lower sub-layer 502 to produce a video at a level of quality that is higher than the base layer. Similarly set-top box 110 (which has higher capabilities than set-top box 108) would receive and decode the lower sub-layer 502 and middle sub-layer to produce video at an even higher level of quality. Set-top box 112 would receive and decode all the sub-layers and produce the highest level of quality video. Accordingly, the video quality produced from the same encoded stream may adaptively vary in accordance with the capabilities of the receiving device. In an embodiment, the differing capabilities of the set-top boxes (or indeed any other type of decoding device) would be defined by multiple profiles, and beneficially devices which are associated with different profiles may decode the same stream.

Once step S116 the frame has been encoded in the hierarchical manner and the process returns to step S104 and is continued until such time that all frames have been encoded.

As described above with reference to FIGS. 4 and 5A to 5F the quantization factor q will determine the number of enhancement pixels that will be encoded. The lower the value of q the fewer the number of enhancement pixels which will be encoded in the enhancement data, and accordingly reduces the amount of enhancement of the base layer. As described with reference to FIG. 4 the pixels which need enhancement are determined. However, in many cases due to the available rate for the transmission of the encoded stream it is not possible to encode each and every enhancement pixel. For example if a system has an encoded stream is a 3 Mb/s and the base layer (e.g. the video MPEG-4 data) comprises 2 Mb/s of data allowing for 1 Mb/s of enhancement data. Accordingly if it is known that the enhancement data comprises N residuals the quantization factor must be selected to ensure that the total stream does not exceed the 3 Mb/s. Accordingly, provisions are made to ensure that the most important pixels are encoded and quantized. This occurs via a rate control mechanism which determines the quantization factor based on the amount of space available for the enhancement data in the encoded stream.

The rate control aspect of the invention relies on the fact that during quantization of a frame, the quantization metric is typically defined such that the residuals are distributed around a value of 0 in a Laplacian distribution, as when entropy encoding such values these pixels will require the fewest amount of bits. An example of the typical distribution of the residuals is shown in as a histogram in FIG. 6A.

Figure 6A:
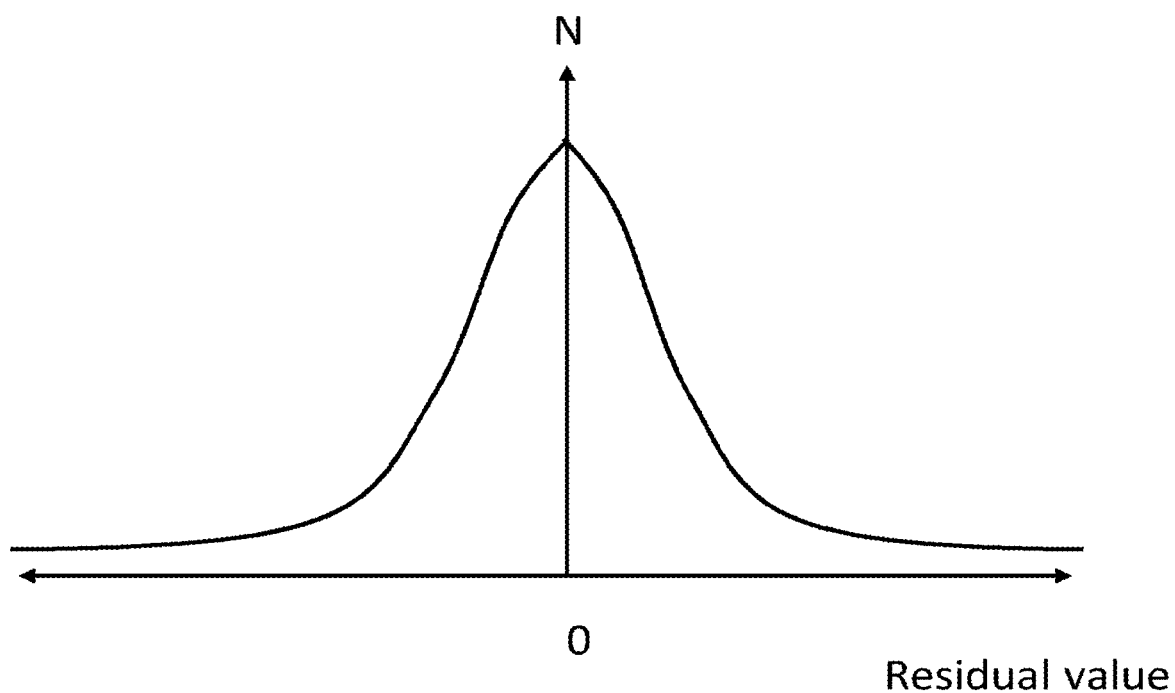
FIGS. 6A to 6D are plots of the residual data used to determine an initial level of quantization according to an aspect of the invention.

In FIG. 6A the x-axis represents the value of the residual and the y axis the number of pixels which have the residual value as they axis. As can be seen due to the Laplace distribution the majority of the pixels have values near 0. The pixels which define the tail of the distribution are fewer in number, however as these represent pixels with the most correction, or enhancement, they are consider to be visually the most important. As such pixels are the most important in terms of enhancement then such pixels are preferentially encoded.

As the pixels which have a value of, or near 0, are less important in terms of enhancement of the base layer a dead-zone is defined around 0. By definition the pixels in the dead zone are deemed to be of lesser importance, and as such can be ignored, whilst reducing the affect that occurs by not including such pixels in the enhancement data.

In an embodiment the number of bits of data to encode the enhancement data based on the residual values varies according to the value of the residual. For example residual values which are, or close to zero, may be encoded utilising a low number of bits as there is little information needed to enhance the pixel. Conversely a high residual value would require a larger number of bits as there would be more information associated with the larger residual. In an embodiment a number of bins are defined, each bin defining a range of residual values. Each bin has a set number of bits to define the enhancement data. As the distribution is known, the number of pixels in each bin is also known and accordingly the total data required to encode the entire enhancement data is also known.

This information can be used to determine the level of quantization required to encode the enhancement data. For example if it is known that 1 Mb is available for the enhancement data then, as described below, the level of quantization is selected so as select pixels with a total 1 Mb of data.

Figure 6B:
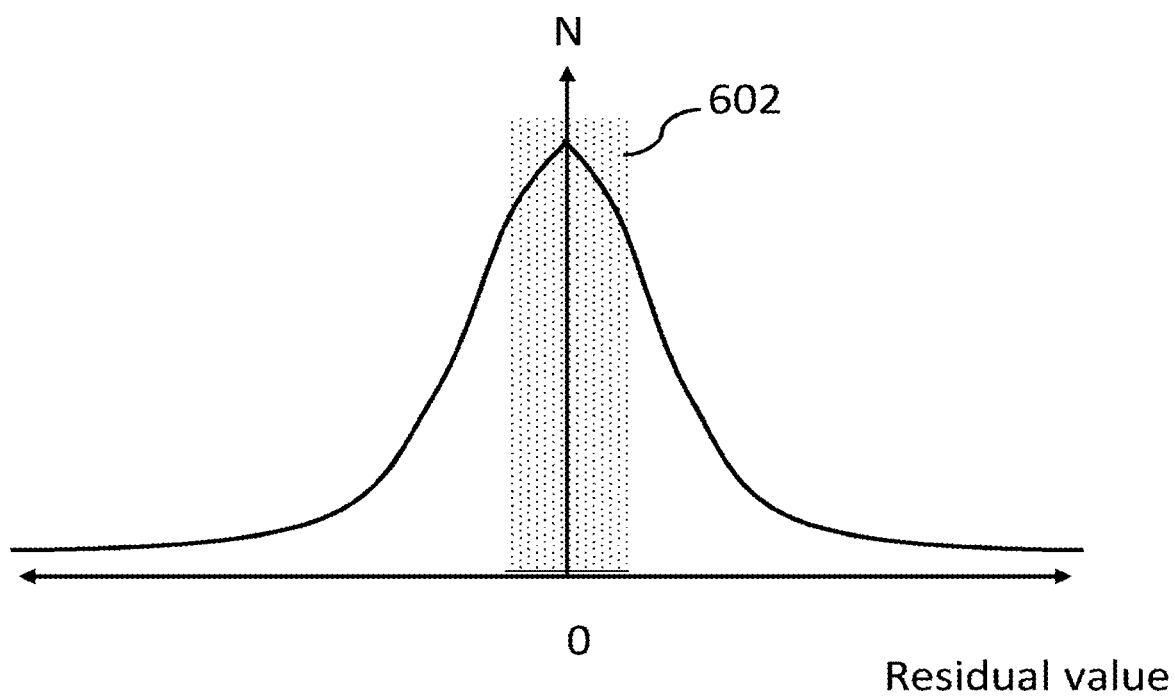

FIG. 6B is a histogram of the same pixel distribution as per FIG. 6A in which a dead zone 602 has been introduced for pixels around 0. The size of the dead zone is shown in FIG. 6A schematically represents the dead zone for the initial level of quantization i.e. it is the highest level of quantization, meaning that a minimum number of pixels are included in the dead zone. As the pixel distribution is known and it is known that pixels which have a value of, or near, 0 have the least impact in the enhancement data it has been realised that such pixels may be removed from the enhancement data with minimal effect on the enhancement of the frame. The dead zone therefore defines the pixels which are not quantized as enhancement data. The width of the dead zone is determined by the quantization factor, and the pixels outside of the dead zone i.e. those in the tail will be encoded. Whilst the pixels near 0 require the least amount of bits to define due to their number the dead zone may result in significant reduction in the size of the enhancement data.

As described above, as the number of pixels are known as well as the number of bits required to describe each pixel, it is possible to determine the level of quantization required to encode the enhancement data.

Figure 6C:
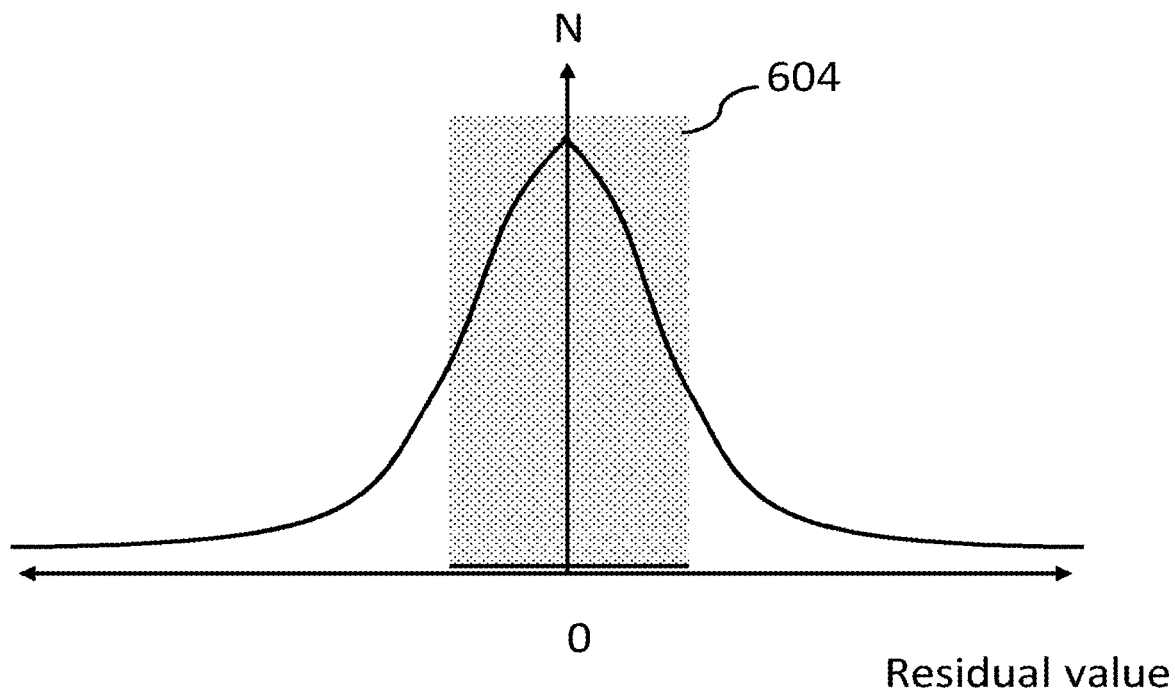

FIG. 6C shows the dead zone 604 for middle sub-layer. As can be seen in FIG. 6C the dead zone 604 is wider than that of the dead zone 602 in FIG. 6B meaning that more pixels are ignored. Accordingly the level of correction is lower, whilst still ensuring that the most significant pixels (i.e. those in the tail) are maintained.

Figure 6D:
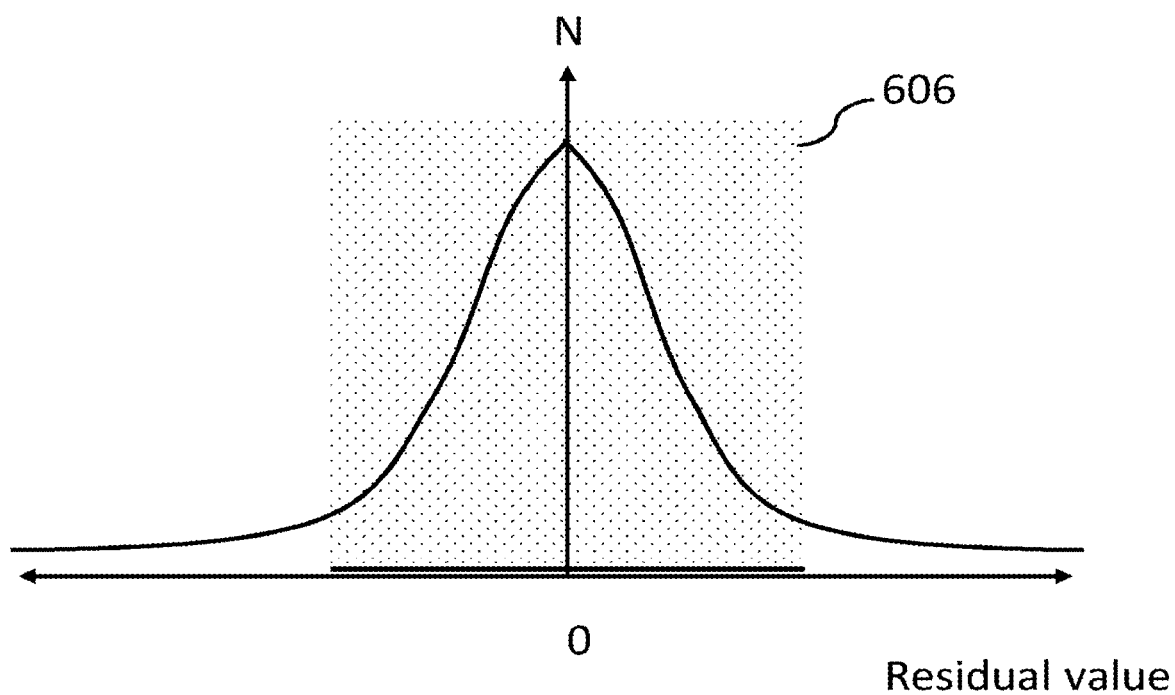

FIG. 6D shows the dead zone 606 for the lowest sub-layer with the lowest level of quantization. The dead zone in FIG. 6D is wider than that of FIG. 6C as more pixels are ignored. Again the most important pixels are encoded in FIG. 6D.

As the available rate is known, it is therefore possible to determine the maximum possible size of the enhancement data. From FIG. 6A it is possible to determine the total size of the enhancement data given the values of the residuals and the number of pixels. Starting from the 0 value of the residuals pixels are included in the dead zone until such time the size of the enhancement data is at, or below, the maximum allowable size. This represents the number of pixels to be quantized from which the initial quantization value, as per step S106, may be determined.

Accordingly, the methodology ensures that the most important enhancement pixels are encoded. The hierarchical arrangement ensures that the recipient device, such as a set-top boxes are able to encode the video at the maximum capability of the device.

The invention claimed is:

1. A method for decoding a first stream of video data comprising a plurality of frames of video, the method, for one or more of the plurality of frames of video, comprising:

decoding, from a hierarchical arrangement, a frame of the video data, the hierarchical arrangement comprising a base layer of video data and a first enhancement layer of video data, said first enhancement layer of video data comprising a plurality of sub-layers of enhancement data, wherein said decoding includes:

obtaining a decoding of the base layer of video data, which comprises data that renders the frame at a first, base level of quality; and decoding each sub-layer of enhancement data to reconstruct data which, when decoded with the base layer, render the frame at a higher level of quality than the base level of quality;

wherein decoding the sub-layers of enhancement data comprises:

decoding a lower sub-layer to produce video data at a level of quality that is higher than the base layer, and decoding a higher sub-layer to produce video data at a level of quality that is higher than the video data produced by decoding the lower sub-layer, wherein each of the plurality of sub-layers has a respective notional quantization level that is used to quantize the first enhancement layer of video data and to generate the sub-layers of enhancement data at an encoder, and wherein a difference in quality exists as between the rendered frame and a corresponding pre-encoded raw frame in that the rendered frame includes a subset of pixels that are of a lower quality as compared to a corresponding subset of pixels that are included in the corresponding pre-encoded raw frame, wherein those corresponding subset of pixels in the raw frame were selected to forgo encoding enhancement, resulting in the subset of pixels in the rendered frame having a reduction in quality.

2. The method of claim 1, wherein pixels to be enhanced within the first enhancement layer are identified based on computed residuals, the computed residuals being determined at the encoder by comparing an encoded frame and a reference frame.

3. The method of claim 2, wherein the reference frame comprises the raw frame of video data.

4. The method of claim 1, wherein the lower sub-layer comprises enhancements for a first set of pixels within a decoded frame of video data and the higher sub-layer comprises enhancements for a second set of pixels within the decoded frame of video data.

5. The method of claim 1, wherein the notional quantization levels are based on the residual values for a plurality of pixels after quantization, with at least one notional quantization level being based on identifying the pixels with the highest residual values, said identified pixels being deemed the most important pixels.

6. The method of claim 1, wherein at least the notional quantization levels are selected such that the data rate of the base layer and quantized enhancement data does not exceed the total available rate.

7. The method of claim 1, wherein the base layer is decoded using an MPEG-4 standard based decoding algorithm.

8. The method of claim 1, wherein the base layer when decoded renders the image at SD resolution, and the first enhancement layer of video data when decoded renders the image at HD or higher resolution.

9. The method of claim 1, further comprising the steps of, prior to said decoding:

receiving a hierarchically encoded content stream at a first client device comprising a decoder, wherein the method is performed by the decoder.

10. The method of claim 9, wherein the encoded video stream is broadcast to a plurality of client devices that include the first client device.

11. The method of claim 9, wherein the base layer is selected as a standard which each of the plurality of client devices is able to decode.

12. The method of claim 9, wherein the number of sub-layers of enhancement decoded by the client device is dependent on the capability of the decoder.

13. The method of claim 1, wherein a measure of the level of quality is the resolution of the video.

14. An apparatus for decoding a first stream of video data comprising a plurality of frames of video, the apparatus comprising a client device, said apparatus comprising:

a decoder configured, for one or more of the plurality of frames of video, to decode, from a hierarchical arrangement, a frame of the video data, the hierarchical arrangement comprising a base layer of video data and a first enhancement layer of video data, said first enhancement layer of video data comprising a plurality of sub-layers of enhancement data, the decoder being further configured to:

obtain a decoding of the base layer of video data, which comprises data which renders the frame at a first, base level of quality; and decode each sub-layer of enhancement data to reconstruct data which, when decoded with the base layer, render the frame at a higher level of quality than the base level of quality;

wherein the decoder is further configured to, with respect to the sub-layers of enhancement data:

decode a lower sub-layer to produce video data at a level of quality that is higher than the base layer; and decode a higher sub-layer to produce video data at a level of quality that is higher than the video data produced by decoding the lower sub-layer, wherein each of the plurality of sub-layers has a respective notional quantization level that is used to quantize the first enhancement layer of video data and to generate the sub-layers of enhancement data at an encoder, and wherein a difference in quality exists as between the rendered frame and a corresponding pre-encoded raw frame in that the rendered frame includes a subset of pixels that are of a lower quality as compared to a corresponding subset of pixels that are included in the corresponding pre-encoded raw frame, wherein those corresponding subset of pixels in the raw frame were selected to forgo encoding enhancement, resulting in the subset of pixels in the rendered frame having a reduction in quality.

15. The apparatus of claim 14, further comprising:

a communications port to receive a hierarchically encoded content stream that encodes the first stream of video data, wherein the decoder is configured to decode the hierarchically encoded content stream.

16. The apparatus of claim 15, further comprising:

a buffer communicatively coupled to the communications port to store the hierarchically encoded content stream prior to decoding by the decoder, wherein, when the apparatus is unable to buffer the entirety of the enhancement data, the apparatus is configured to render the base layer at a minimum level of quality.

17. The apparatus of claim 14, wherein the apparatus is configured to adaptively vary the quality of output video data by varying how the sub-layers of enhancement data are decoded and rendered.

18. The apparatus of claim 14, wherein the base layer has a first assigned data rate and the first enhancement layer has a second assigned data rate, wherein the notional quantization levels are determined via a rate control mechanism based on the second assigned data rate.

19. The apparatus of claim 18, wherein the rate control mechanism selects notional quantization levels such that residuals within the enhancement data require the fewest amount of bits following entropy encoding.

20. The apparatus of claim 14, comprising one of: a set-top box, a smart television, a smartphone, a tablet computer, a laptop computer, and a desktop computer.

* * * * *